US012782317B2

(12) United States Patent
Takeuchi et al.

(10) Patent No.: US 12,782,317 B2
(45) Date of Patent: Nov. 3, 2026

(54) ELECTROPHORESIS DEVICE

(71) Applicant: Hitachi High-Tech Corporation, Tokyo (JP)

(72) Inventors: Shinji Takeuchi, Tokyo (JP); Takashi Gomi, Tokyo (JP); Motohiro Yamazaki, Tokyo (JP); Tetsuo Tamura, Tokyo (JP); Akiyuki Nemoto, Tokyo (JP); Tomonari Morioka, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 168 days.

(21) Appl. No.: 18/842,441

(22) PCT Filed: Mar. 18, 2022

(86) PCT No.: PCT/JP2022/012810
§ 371 (c)(1),
(2) Date: Aug. 29, 2024

(87) PCT Pub. No.: WO2023/175960
PCT Pub. Date: Sep. 21, 2023

(65) Prior Publication Data
US 2025/0180511 A1 Jun. 5, 2025

(51) Int. Cl.
*G01N 27/453* (2006.01)
*G01N 27/447* (2006.01)

(52) U.S. Cl.
CPC . *G01N 27/44743* (2013.01); *G01N 27/44756* (2013.01)

(58) Field of Classification Search
CPC ....... G01N 27/44743; G01N 27/44756; G01N 27/44782; G01N 27/44791; G01N 27/453;
(Continued)

(56) References Cited

U.S. PATENT DOCUMENTS 6,325,114 B1 * 12/2001 Bevirt ................ G01N 35/1074 422/561
2003/0187600 A1 * 10/2003 Barnes .................. G01N 35/10 702/85
(Continued)

FOREIGN PATENT DOCUMENTS

JP 7-334245 A 12/1995
JP 2005-531769 A 10/2005
(Continued)

OTHER PUBLICATIONS

EPO machine-generated English language translation of JP 2010145284 A , patent published Jul. 1, 2010 (Year: 2010).*
(Continued)

*Primary Examiner* — Alexander S Noguerola
(74) *Attorney, Agent, or Firm* — Crowell & Moring LLP

(57) ABSTRACT

To provide an electrophoresis device in which a system configuration of an autosampler is simplified, the electrophoresis device that separates a sample via electrophoresis and analyzes the sample includes: a conveyance unit that conveys a container containing the sample and a buffer solution to a target position; a contact portion with which a jig mounted on the conveyance unit or a portion of the conveyance unit comes into contact when the conveyance unit is moved to the target position; and a control unit that records, as a calibration value, a distance from a position where the jig or the portion of the conveyance unit has come into contact with the contact portion to an origin point, and controls movement of the conveyance unit based on the calibration value.

3 Claims, 7 Drawing Sheets

(58) Field of Classification Search
CPC ... G01N 2030/8804; G01N 2030/8809; G01N 2030/8881; G01N 2030/8886; G01N 2035/00178; G01N 2035/00237; G01N 35/00584; G01N 35/00594; G01N 35/00693
See application file for complete search history.

(56) References Cited

U.S. PATENT DOCUMENTS

| | | | | |
|---|---|---|---|---|
| 2004/0096368 | A1* | 5/2004 | Davis | F04B 53/162<br>422/400 |
| 2014/0093426 | A1* | 4/2014 | Hirano | G01N 35/1011<br>422/67 |
| 2015/0338347 | A1* | 11/2015 | Tsai | G01N 21/64<br>204/603 |

FOREIGN PATENT DOCUMENTS

| | | | | | |
|---|---|---|---|---|---|
| JP | 2006-84411 | A | | 3/2006 | |
| JP | 2008-281365 | A | | 11/2008 | |
| JP | 2010145284 | A | * | 7/2010 | G01N 35/00 |
| JP | 2013-117541 | A | | 6/2013 | |
| JP | 2014-119291 | A | | 6/2014 | |
| JP | 2021-124443 | A | | 8/2021 | |
| WO | WO 2012/157642 | A1 | | 11/2012 | |
| WO | WO 2014/162921 | A1 | | 10/2014 | |

OTHER PUBLICATIONS

EPO machine-generated English language translation of JP 2006084411 A , patent published Mar. 30, 2006 (Year: 2006).*

EPO machine-generated English language translation of JP H07-33445A, patent published Dec. 22, 1995 (Year: 1995).*

International Search Report (PCT/ISA/210) issued in PCT Application No. PCT/JP2022/012810 dated May 17, 2022 with English translation (7 pages).

Japanese-language Written Opinion (PCT/ISA/237) issued in PCT Application No. PCT/JP2022/012810 dated May 17, 2022 with English translation (7 pages).

International Preliminary Report on Patentability (PCT/IPEA/409) issued in PCT Application No. PCT/JP2022/012810 dated Dec. 28, 2022 (5 pages).

* cited by examiner

ELECTROPHORESIS DEVICE

TECHNICAL FIELD

The present invention relates to an electrophoresis device and to position calibration for conveyance of a container containing a sample and a buffer solution.

BACKGROUND ART

An electrophoresis device is a device that separates a fluorescently labeled sample via electrophoresis within a capillary and analyzes the sample by detecting fluorescence induced by irradiation with excitation light. Many electrophoresis devices are provided with autosamplers that convey containers containing samples and buffer solutions to predetermined positions. When a container conveyed by an autosampler is misaligned, a failure may occur during injection of a sample into a capillary or the like, and thus highly accurate position calibration is required.

Patent Literature 1 discloses that an autosampler calibrates the position of a needle based on image data obtained by imaging a tip portion of the needle for sucking and ejecting a sample and a sample container from above, and a pulse signal until the needle moves from an initial position to a target position is used as a calibration value.

Citation List

Patent Literature

Patent Literature 1: International Publication WO 2014/162921

SUMMARY OF INVENTION

Technical Problem

However, in Patent Literature 1, an image capturing apparatus that captures image data for position calibration is required and a system configuration of an electrophoresis device is complex.

Therefore, an object of the present invention is to provide an electrophoresis device in which a system configuration is simplified.

Solution to Problem

To achieve the above-described object, according to the present invention, an electrophoresis device that separates a sample via electrophoresis and analyzes the sample includes: a conveyance unit that conveys a container containing the sample and a buffer solution to a target position; a contact portion with which a jig mounted on the conveyance unit or a portion of the conveyance unit comes into contact when the conveyance unit is moved to the target position; and a control unit that records, as a calibration value, a distance from a position where the jig or the portion of the conveyance unit has come into contact with the contact portion to an origin point, and controls movement of the conveyance unit based on the calibration value.

Advantageous Effects of Invention

According to the present invention, it is possible to provide an electrophoresis device in which a system configuration is simplified.

DESCRIPTION OF EMBODIMENTS

Hereinafter, preferred embodiments of an electrophoresis device according to the present invention will be described with reference to the accompanying drawings. The electrophoresis device is a device that separates a fluorescently labeled sample via electrophoresis and analyzes the sample by detecting fluorescence induced by irradiation with excitation light.

First Embodiment

Figure 1:
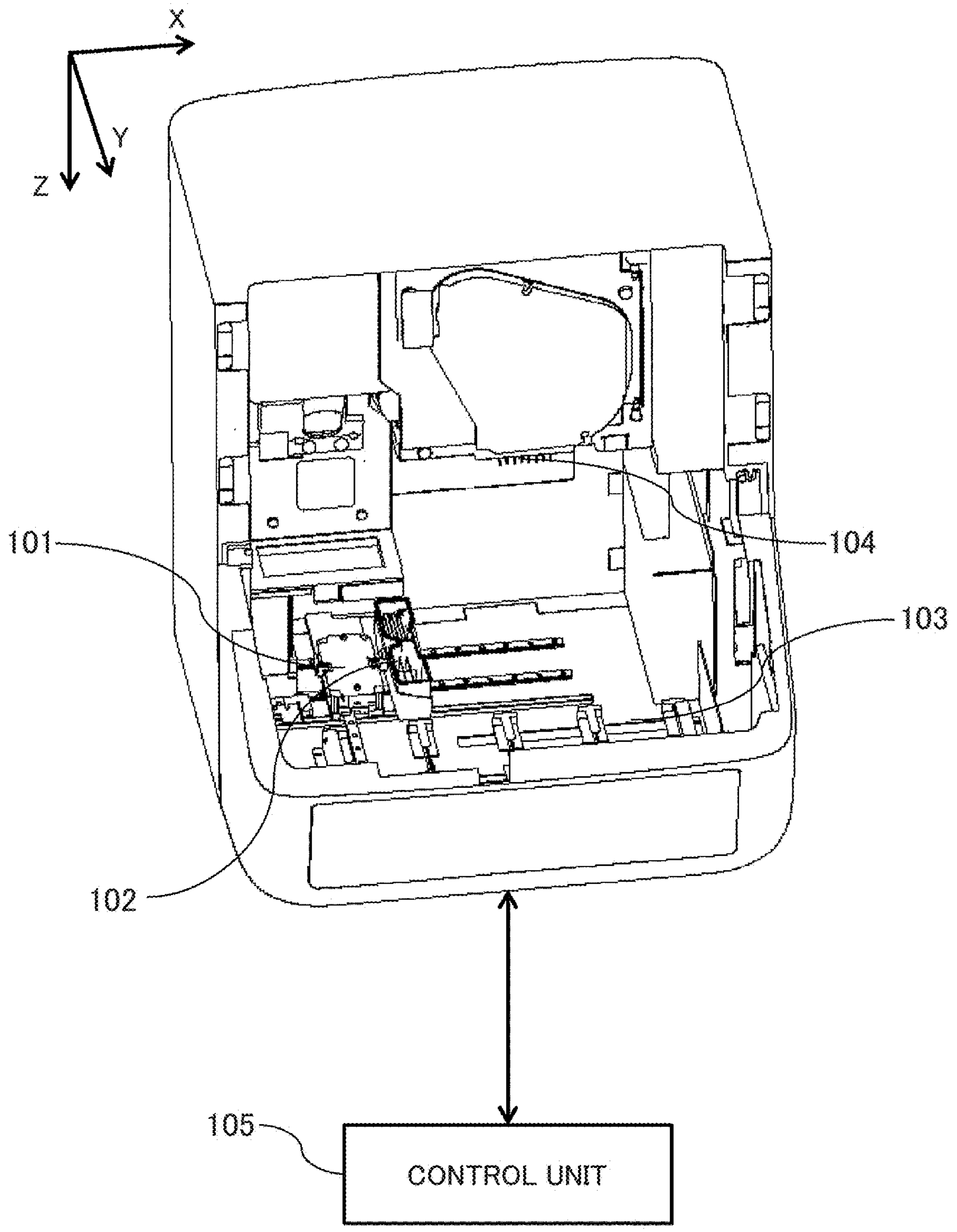
FIG. 1 is a perspective view illustrating an example of an overall configuration of an electrophoresis device according to a first embodiment.

An example of an overall configuration of an electrophoresis device according to a first embodiment will be described with reference to FIG. 1. The electrophoresis device includes a container 102 containing a sample and a buffer solution, a conveyance unit 101 that conveys the container 102 to a target position 103 where a capillary tip 104 accesses the container 102, and a control unit 105 that is a computer that controls each unit. The sample and the buffer solution are injected from the capillary tip 104 into a capillary and used for analysis.

When the container 102 conveyed by the conveyance unit 101 is misaligned from the target position 103, a failure occurs in the injection of the sample and the like into the capillary. Therefore, highly accurate position calibration is required. In the first embodiment, the highly accurate position calibration is implemented by recording, as a calibration value, a distance from a position where a jig mounted on the conveyance unit 101 has come into contact with a contact portion disposed at the target position 103 to an origin point. The recorded calibration value is used for control to move the conveyance unit 101 to the target position 103.

Figure 2:
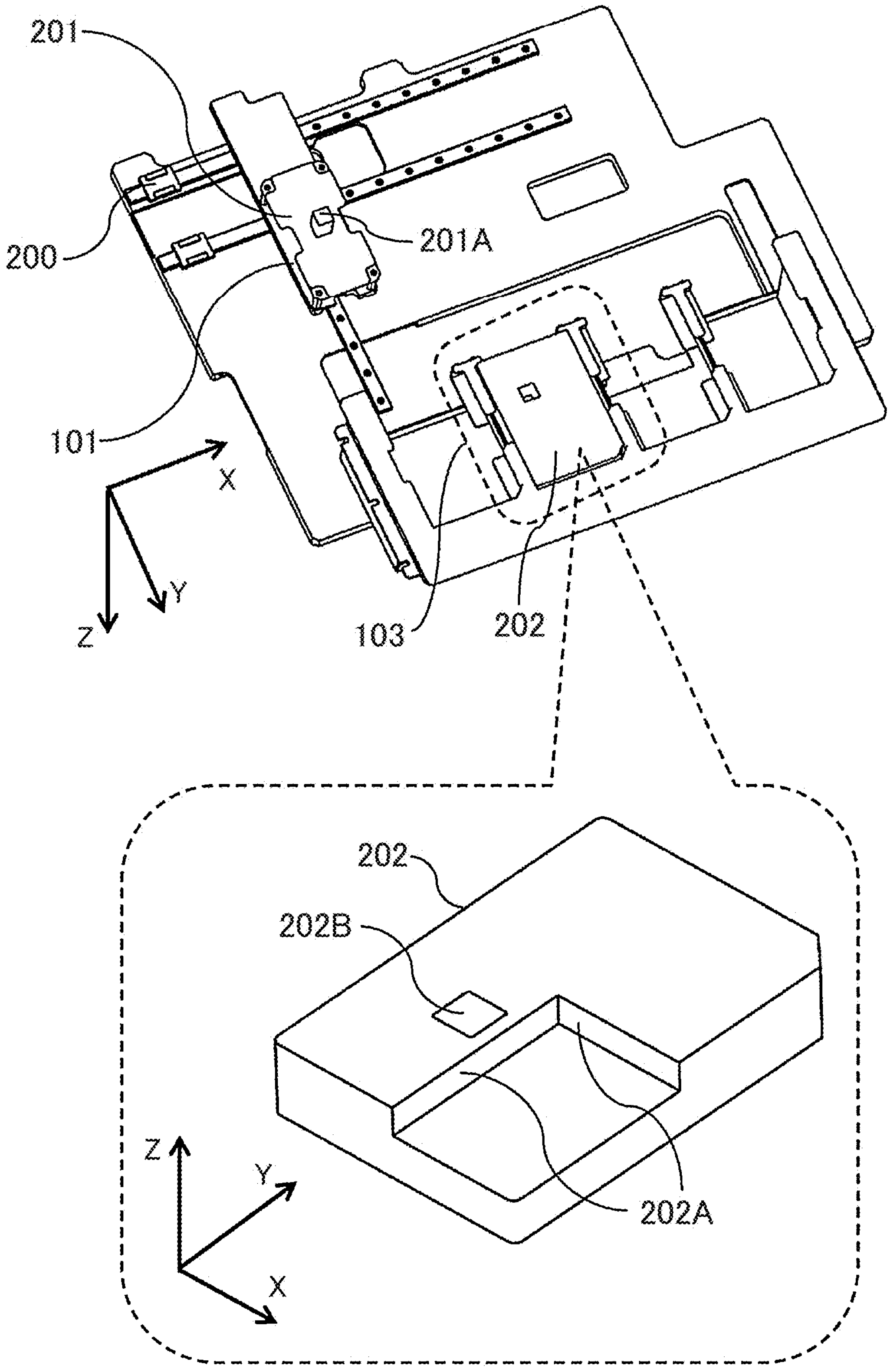
FIG. 2 is a perspective view illustrating an example of a movable-side jig and a fixed-side jig according to the first embodiment.

An example of a movable-side jig 201 that is the jig mounted on the conveyance unit 101 and a fixed-side jig 202 that is a jig disposed at the target position 103 will be described with reference to FIG. 2. The conveyance unit 101 is slid on a rail extending an X axis direction and a Y axis direction by drive force of a motor and moved between the origin point 200 and the target position 103. The motor generates retention force for retaining the conveyance unit 101 at the position in a state in which the motor is not energized, that is, is in a non-excited state.

The movable-side jig 201 is a jig mounted on the conveyance unit 101 and includes a protruding portion 201A protruding upward. The protruding portion 201A has a prismatic shape having a surface perpendicular to X, Y, and Z axes.

The fixed-side jig 202 is a jig disposed at the target position 103 and has a shape in which a part of a rectangular parallelepiped is cut into a rectangular parallelepiped, and a surface formed by the cutting is a contact portion 202A. The contact portion 202A is the surface with which the protruding portion 201A of the movable-side jig 201 comes into contact. The fixed-side jig 202 may have a peephole 202B. The peephole 202B is used to visually check the position of the movable-side jig 201.

An example of a process procedure according to the first embodiment will be described for each step with reference to FIG. 3.

S301

The motor for driving the conveyance unit 101 is turned off. The movable-side jig 201 is mounted on the conveyance unit 101, and the fixed-side jig 202 is disposed at the target position 103 in advance.

S302

The conveyance unit 101 is moved toward the target position 103. The conveyance unit 101 is, for example, manually moved by an operator. While the retention force is generated by the motor, the conveyance unit 101 can be manually moved.

S303

It is determined whether the protruding portion 201A of the movable-side jig 201 mounted on the conveyance unit 101 has come into contact with the contact portion 202A of the fixed-side jig 202. In a case where the protruding portion 201A has come into contact with the contact portion 202A, the process proceeds to S304. In a case where the protruding portion 201A has not come into contact with the contact portion 202A, the process returns to S302.

Figure 4:
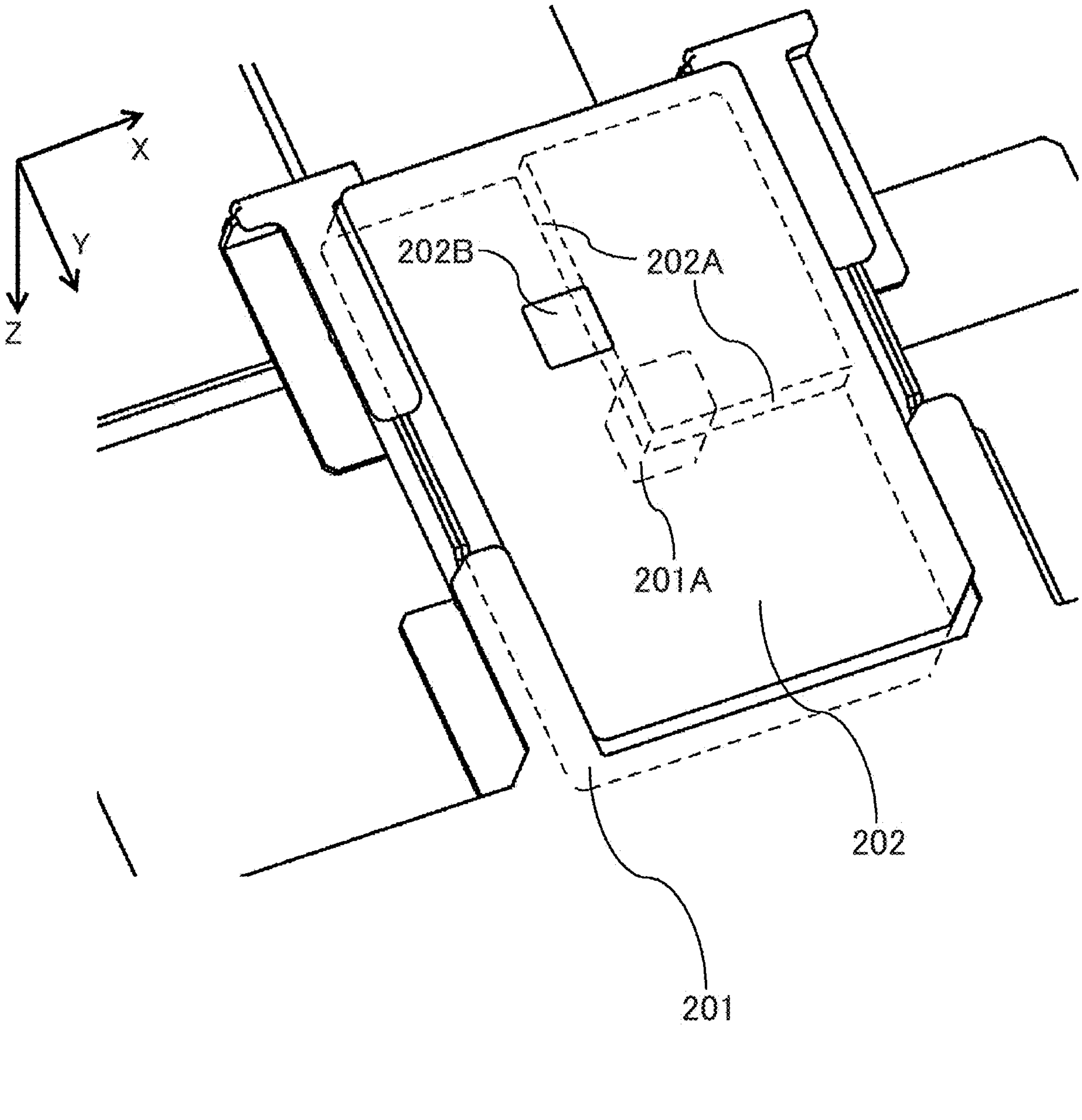
FIG. 4 is a perspective view illustrating contact of the movable-side jig with the fixed-side jig.

The contact of the movable-side jig 201 with the fixed-side jig 202 will be described with reference to FIG. 4. FIG. 4 exemplifies a state in which the protruding portion 201A of the movable-side jig 201 located below the fixed-side jig 202 is in contact with the contact portion 202A of the fixed-side jig 202. Since the state in which both of the portions are in contact with each other cannot be visually checked, whether the portions are in contact with each other is determined by, for example, the operator's sense of touch.

S304

The motor is turned on. Immediately after the motor is turned on, the conveyance unit 101 may be slightly moved such that the movable-side jig 201 is separated from the fixed-side jig 202. The slight movement can prevent the protruding portion 201A and the contact portion 202A from being damaged.

S305

The control unit 105 controls the conveyance unit 101 to cause the conveyance unit 101 to return to the origin point 200. Whether the conveyance unit 101 has returned to the origin point 200 is detected by an optical sensor disposed at the origin point 200 or the like.

S306

The control unit 105 records, as a calibration value, a distance from a contact position where the protruding portion 201A has come into contact with the contact portion 202A to the origin point 200. The distance from the contact position to the origin point 200 is calculated based on the number of drive pulses to the motor that have been counted in a time period to the time when the conveyance unit 101 returns from the contact position to the origin point 200.

Figure 3:
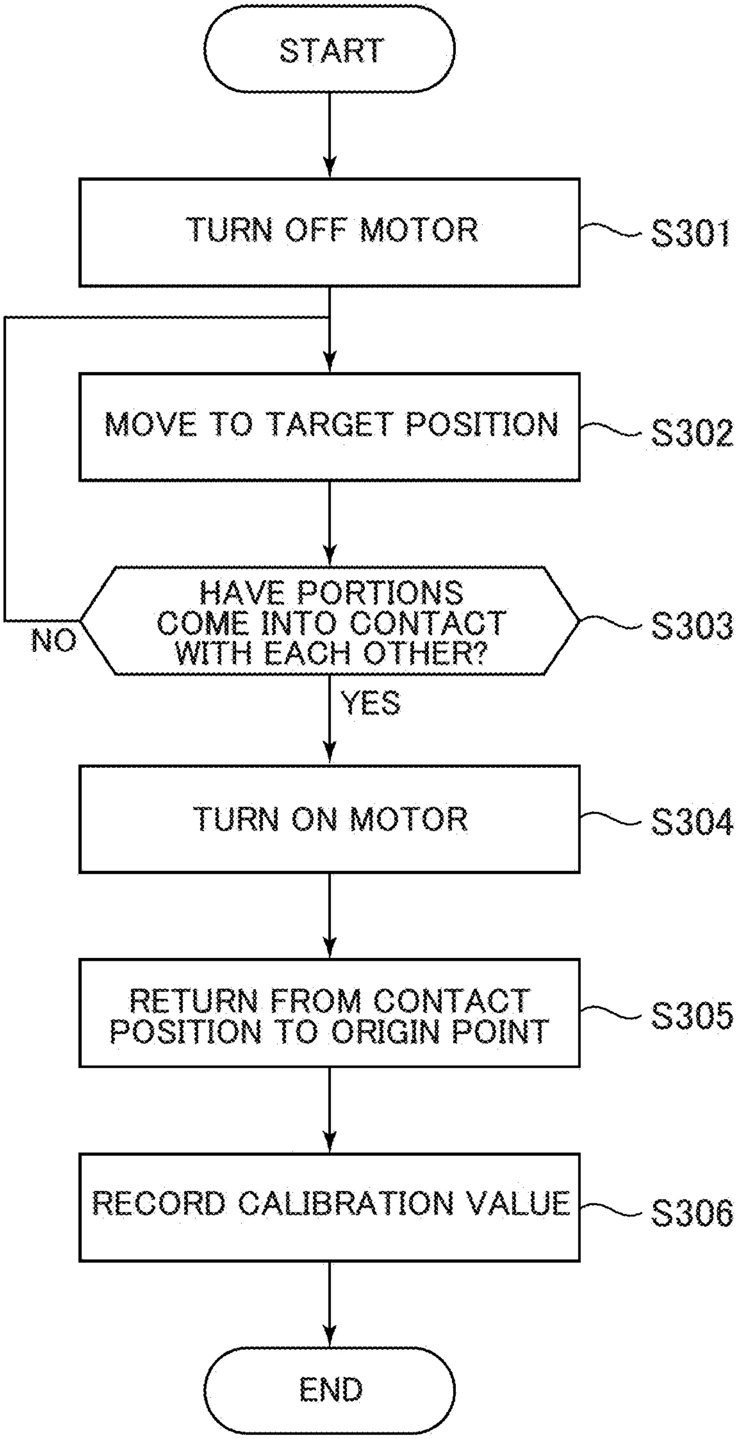
FIG. 3 is a diagram illustrating an example of a process procedure according to the first embodiment.

According to the process procedure exemplified in FIG. 3, since the distance from the position where the protruding portion 201A has come into contact with the contact portion 202A to the origin point 200 is recorded as the calibration value, it is possible to perform highly accurate position calibration. The control unit 105 uses the recorded calibration value to move the conveyance unit 101 from the origin point 200 to the target position 103. In addition, since it is possible to record the calibration value without using an image capturing apparatus, it is possible to simplify a system configuration of the electrophoresis device.

A portion that comes into contact with the contact portion 202A of the fixed-side jig 202 is not limited to the protruding portion 201A of the movable-side jig 201. For example, a portion of the conveyance unit 101 may come into contact with the contact portion 202A of the fixed-side jig 202.

In addition, the calibration value may be recorded over time. In a case where the calibration value is recorded over time, the control unit 105 can calculate and present a time when the electrophoresis device is to be inspected. That is, the control unit 105 can predict, as the time when the electrophoresis device is to be inspected, a time when the calibration value exceeds a predetermined threshold, based on a change in the calibration value over time.

Second Embodiment

In the first embodiment, it has been described that the conveyance unit 101 with the movable-side jig 201 mounted thereon is manually moved toward the target position 103 and the contact of the protruding portion 201A with the contact portion 202A is determined by the sense of touch. In a second embodiment, it will be described that the conveyance unit 101 is moved by driving of the motor and whether the portions have come into contact with each other is determined using step-out of the motor. In the second embodiment, parts of the configurations and functions described in the first embodiment can be applied, and thus the same configurations and functions are denoted by the same reference signs and will not be described.

An example of a process procedure according to the second embodiment will be described for each step with reference to FIG. 5.

S501

The control unit 105 turns on the motor that drives the conveyance unit 101. The movable-side jig 201 is mounted on the conveyance unit 101, and the fixed-side jig 202 is disposed at the target position 103.

S502

The control unit 105 transmits an instruction signal to the motor to move the conveyance unit 101 with the movable-side jig 201 mounted thereon toward the target position 103.

S503

The control unit 105 determines whether the signal for the movement to the target position 103 has ended. In a case where the signal has ended, the process proceeds to S305. In a case where the signal has not ended, the process returns to S502. That is, the control unit 105 continues to move the conveyance unit 101 toward the target position 103 until the motor falls out of step.

When the control unit 105 continues to move the conveyance unit 101 in a state in which the protruding portion 201A is in contact with the contact portion 202A, synchronization between the signal input to the motor and the rotation of the motor is lost and the motor falls out of step.

That is, when the motor falls out of step, it is possible to determine that the protruding portion 201A has come into contact with the contact portion 202A.

In a case where the motor is a stepping motor, an excitation method may be any one of two-phase excitation, one-two-phase excitation, or one-phase excitation. However, one-phase excitation with relatively low variable torque is desirable to reduce damage during the contact of the protruding portion 201A with the contact portion 202A.

Figure 6:
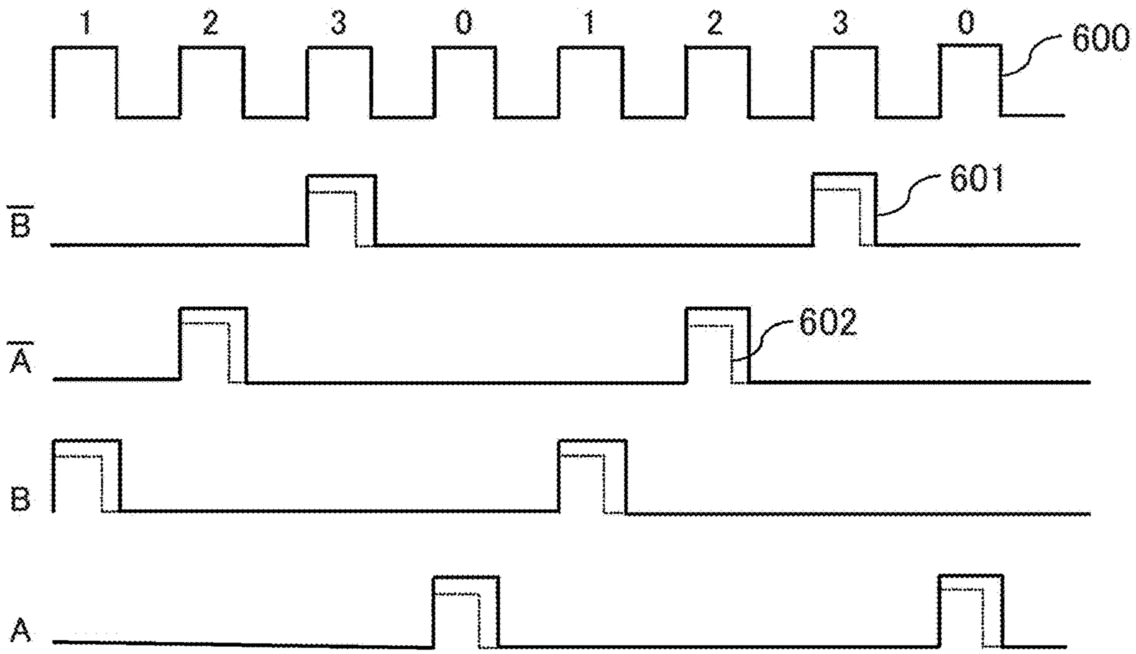
FIG. 6 is a diagram illustrating an example of an excitation waveform of a motor.

FIG. 6 exemplifies a waveform when the stepping motor is rotated with one-phase excitation. A waveform at the first stage among five waveforms is a clock pulse 600, and the waveforms at the second to fifth stages are one-phase excitation waveforms 601 that excite four stator coils included in the stepping motor. The stator coils at the second and fourth stages are arranged facing each other, and the stator coils at the third and fifth stages are arranged facing each other. When excitation with a modulation waveform 602 having a reduced crest value and a narrowed pulse width is performed, retention force of the stepping motor is reduced and the stepping motor is likely to fall out of step.

S305

The control unit 105 controls the conveyance unit 101 to cause the conveyance unit 101 to return to the origin point 200 as in the first embodiment. The conveyance unit 101 may be slightly moved such that the movable-side jig 201 is separated from the fixed-side jig 202.

S306

The control unit 105 records, as the calibration value, a distance from a position when the motor has fallen out of step to the origin point 200.

Figure 5:
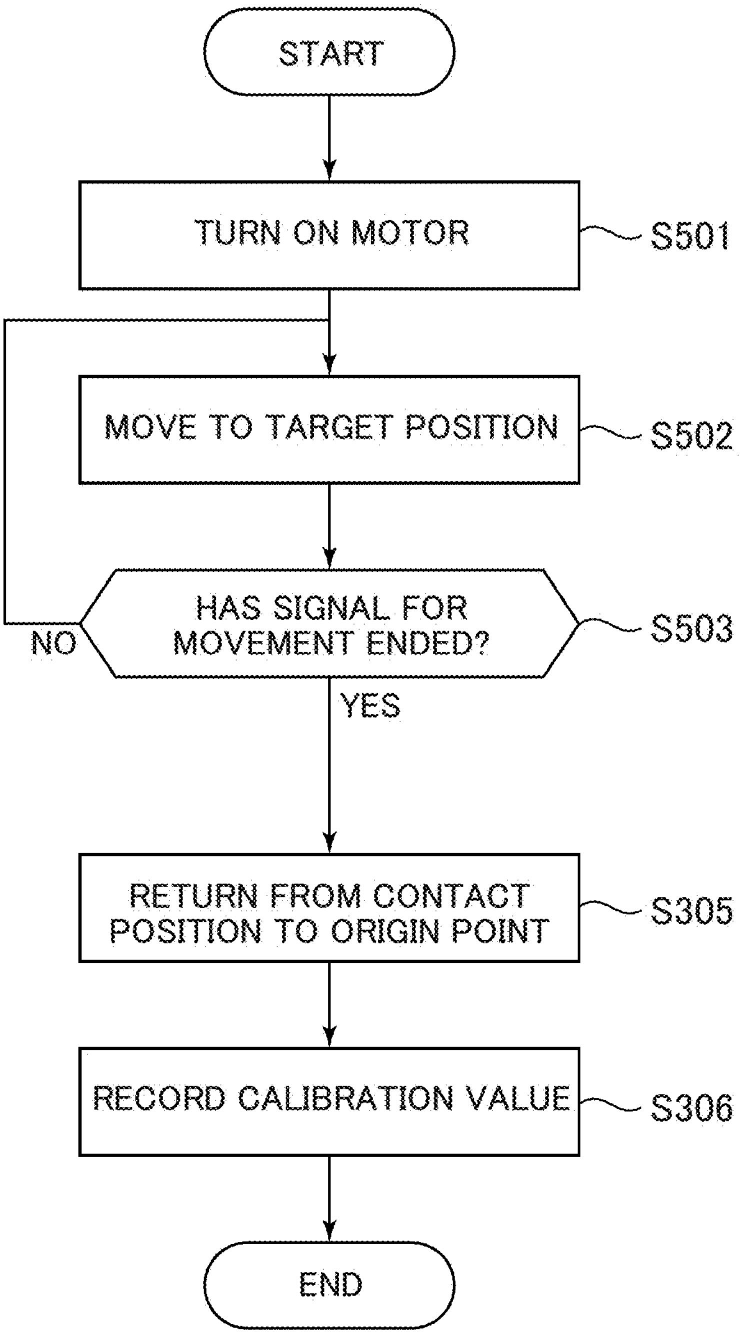
FIG. 5 is a diagram illustrating an example of a process procedure according to a second embodiment.

According to the process procedure exemplified in FIG. 5, it is possible to record, as the calibration value, the distance from the position when the motor has fallen out of step to the origin point 200 without bothering the operator. The recorded calibration value is used for control to move the conveyance unit 101 from the origin point 200 to the target position 103 as in the first embodiment. In addition, also in the second embodiment, since it is possible to record the calibration value without using an image capturing apparatus, it is possible to simplify the system configuration of the electrophoresis device.

Third Embodiment

In the second embodiment, it has been described that the conveyance unit 101 is moved by driving of the motor and whether the protruding portion 201A has come into contact with the contact portion 202A is determined using step-out of the motor. In a third embodiment, it will be described that the fixed-side jig 202 is disposed on a contact sensor that detects whether the protruding portion 201A and the contact portion 202A are in contact with each other. In the third embodiment, parts of the configurations and functions described in the first and second embodiments can be applied, and thus the same configurations and functions are denoted by the same reference signs and will not be described.

Figure 7A:
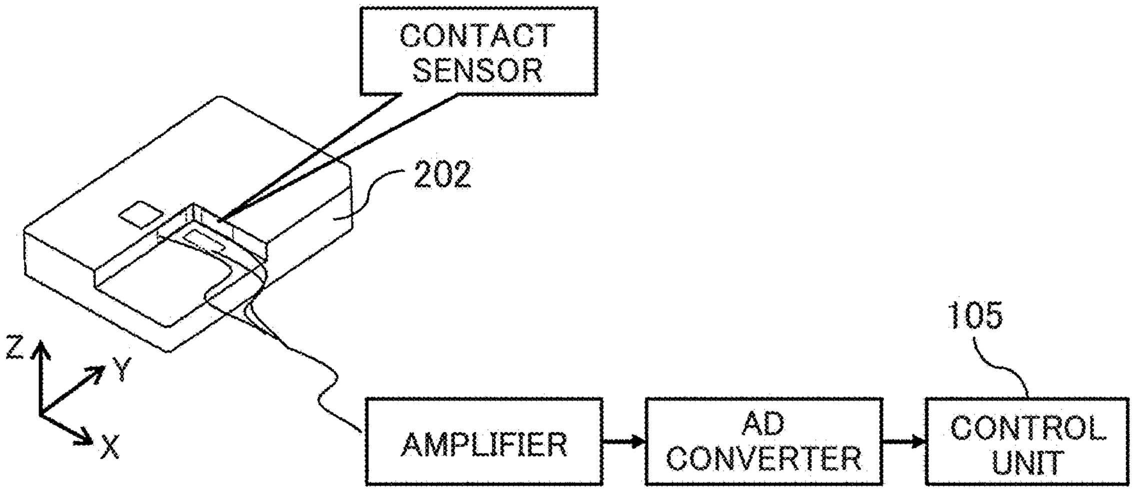
FIG. 7A is a diagram illustrating an example of a fixed-side jig according to a third embodiment.

An example of the fixed-side jig 202 according to the third embodiment will be described with reference to FIG. 7A. The fixed-side jig 202, as in the first embodiment, has a shape in which a part of a rectangular parallelepiped is cut into a rectangular parallelepiped, and includes a contact portion on surfaces formed by the cutting, and contact sensors are disposed on the contact portion. The contact sensors are disposed for the respective surfaces perpendicular to the X, Y, and Z axes. Detection signals output from the contact sensors through cables are amplified by an amplifier, converted into digital signals by an AD converter, and transmitted to the control unit 105.

Figure 7B:
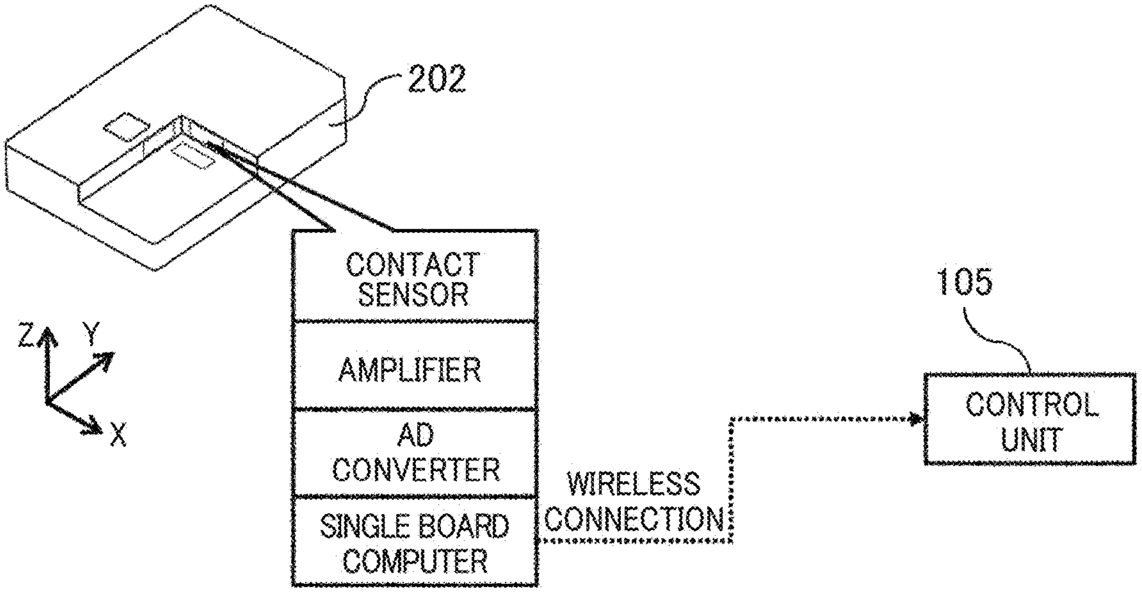
FIG. 7B is a diagram illustrating another example of the fixed-side jig according to the third embodiment.

As illustrated in FIG. 7B, the contact sensors, the amplifier, the AD converter, and a single board computer (SBC) may be integrated and disposed on the contact portion. The detection signals output from the contact sensors are transmitted to the control unit 105 via a wireless connection after being amplified and converted into the digital signals.

A process procedure according to the third embodiment is similar to the process procedure according to the second embodiment. However, in S503, whether the portions have come into contact with each other is determined based on the detection signals from the contact sensors without using step-out of the motor.

Also in the third embodiment, it is possible to record, as a calibration value, a distance from a position where the protruding portion 201A has come into contact with the contact portion 202A to the origin point 200 without bothering the operator, as in the second embodiment. The recorded calibration value is used for control to move the conveyance unit 101 from the origin point 200 to the target position 103. In addition, since it is possible to record the calibration value without using an image capturing apparatus, it is possible to simplify a system configuration of the electrophoresis device.

Comparative Example

It has been described that the calibration value is recorded using, as a reference, the position where the protruding portion 201A of the movable-side jig 201 has come into contact with the contact portion 202A of the fixed-side jig 202 in the first and third embodiments, and using, as a reference, the position when the motor has fallen out of step in the second embodiment. As a comparative example for the first to third embodiments, it will be described that a calibration value is recorded using, as a reference, a position where a pin disposed on a conveyance unit 101 penetrates through a hole disposed at a target position 103. In the comparative example, parts of the configurations and functions described in the first to third embodiments can be applied, and thus the same configurations and functions are denoted by the same reference signs and will not be described.

Figure 8:
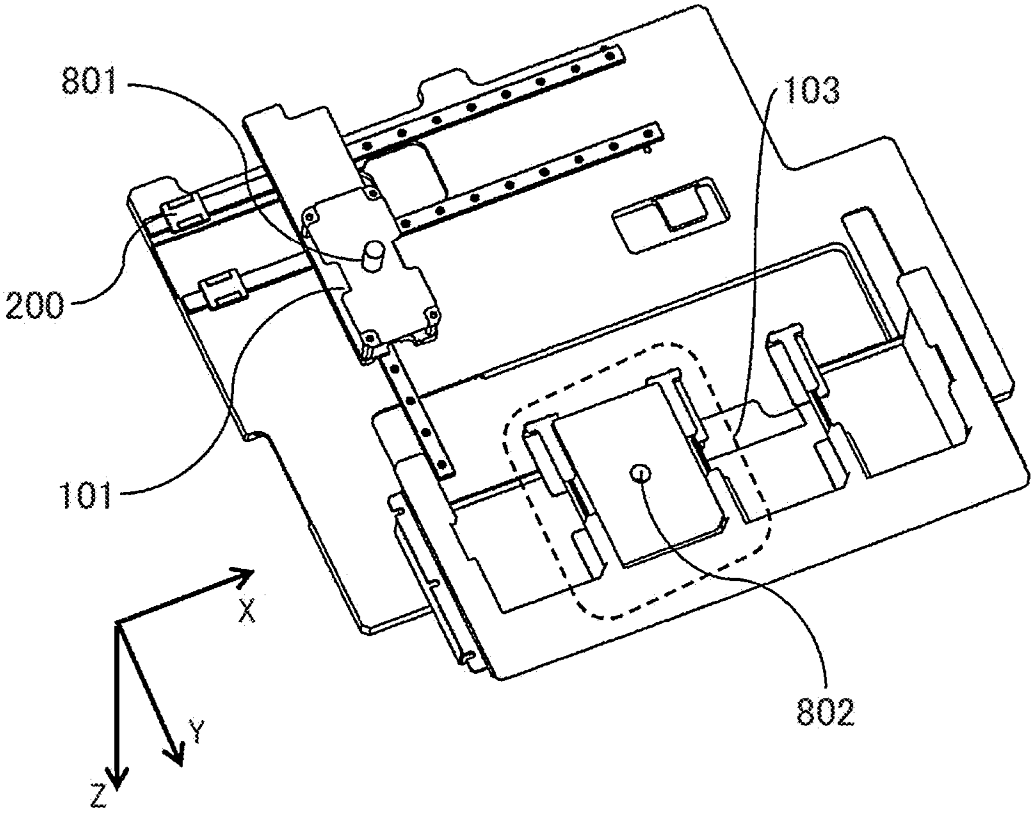
FIG. 8 is a perspective view illustrating an example of a pin and a through-hole according to a comparative example.

FIG. 8 illustrates an example of the pin 801 disposed on the conveyance unit 101 and the through-hole 802 disposed at the target position 103. The pin 801 has a cylindrical shape and protrudes upward. The through-hole 802 is a circular through-hole having an inner diameter smaller than an outer diameter of the pin 801.

An operator moves the conveyance unit 101 to the target position 103 and visually checks a state in which the pin 801 penetrates through the through-hole 802. Thereafter, the conveyance unit 101 is returned to an origin point 200, and a distance from a position where the 801 penetrates through the through-hole 802 to the origin point 200 is recorded as a calibration value. The recorded calibration value is used for control to move the conveyance unit 101 to the target position 103. While the position as a reference is visually checked in the comparative example, the position as a reference can be easily detected and an adjustment step is easy in the first to third embodiments in which the contact and the step-out are used.

The embodiments of the present invention have been described above. The present invention is not limited to the above-described embodiments, and the constituent elements may be modified without departing from the gist of the present invention. In addition, the plurality of constituent elements disclosed in the embodiments may be combined as appropriate. Further, some constituent elements may be removed from all the constituent elements described above in the embodiments.

LIST OF REFERENCE SIGNS

101: conveyance unit, 102: container, 103: target position, 104: capillary tip, 200: origin point, 201: movable-side jig, 201A: protruding portion, 202: fixed-side jig, 202A: contact portion, 202B: peephole, 600: clock pulse, 601: one-phase excitation waveform, 602: modulation waveform, 801: pin, 802: through-hole

The invention claimed is:

1. An electrophoresis device that separates a sample via electrophoresis and analyzes the sample, the electrophoresis device comprising:

a conveyance unit that conveys a container containing the sample and a buffer solution to a target position;

a contact portion with which a jig mounted on the conveyance unit or a portion of the conveyance unit comes into contact when the conveyance unit is moved to the target position; and a control unit that records, as a calibration value, a distance from a position where the jig or the portion of the conveyance unit has come into contact with the contact portion to an origin point, and controls movement of the conveyance unit based on the calibration value;

wherein the control unit records, as the calibration value, a distance from the origin point to a position at which a motor that drives the conveyance unit has fallen out of step with respect to an expected angular movement of the motor for a given excitation waveform for exciting the motor.

2. The electrophoresis device according to claim 1, wherein the control unit is configured to reduce a peak value and a pulse width of the given excitation waveform to output a modulated pulse waveform for exciting the motor.

3. The electrophoresis device according to claim 1, wherein the calibration value is variable over time, and the control unit records the calibration value over time and determines a time to inspect position calibration accuracy of the conveyance unit based on a change in the calibration value over time.

* * * * *